3,271,320
POLONIUM RECOVERY
Raymond H. Moore, Kennewick, Wash., assignor to the United States of America as represented by the United States Atomic Energy Commission
No Drawing. Filed Mar. 26, 1965, Ser. No. 443,114
3 Claims. (Cl. 252—301.1)

The invention described herein was made in the course of, or under, a contract with the United States Atomic Energy Commission.

This invention relates to a process of recovering polonium.

When bismuth is exposed to neutrons in a nuclear reactor, some of the bismuth is converted to polonium, for instance, in accordance with the following equations:

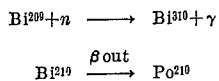

$Bi^{209} + n \longrightarrow Bi^{210} + \gamma$ $Bi^{210} \xrightarrow{\beta \text{ out}} Po^{210}$ $Po^{210}$ is an alpha-emitter, and it is used in combination with lithium, beryllium or boron as a neutron source. $Po^{210}$ has also been employed per se for the ionization of gases. Since the alpha activity of $Po^{210}$ is very high, it develops a great amount of heat which can lead to the melting or even to the evaporation of the polonium. The heat developed by $Po^{210}$ can be converted into electricity, and the polonium can thus be used as a source of low-voltage electricity. Because of this great amount of heat polonium should be stored and shipped in diluted form; a bismuth solution is especially favorable for this on account of its good heat conductivity.

Since bismuth has a low capture cross section for neutrons, and $Po^{210}$ has a relatively short half-life, the most desirable mode of operation is to leave the bismuth in the reactor, where it will attain its equilibrium concentration under the particular neutron flux, until the polonium is required, to remove the bismuth, separate polonium from it, and return the bismuth to the reactor as soon as possible.

In a cyclic process of this type, it is extremely desirable to carry out the process by a method that does not change the chemical state of the bismuth. It is desirable that the process be as simple as possible and that a high proportion of the polonium be removed together with only a small proportion of the bismuth in a single-stage treatment. A high-efficiency separation is not necessary.

Polonium has been separated from bismuth heretofore by vacuum distillation. However, it was found very difficult to carry out this method on a large scale, and extensive shielding was necessary on account of the high radioactivity of the vapors formed.

It is an object of this invention to provide a process for the recovery of polonium from bismuth that is simple, requires relatively little shielding, especially in comparison with the distillation method, and that can be readily carried out by remote control.

It has been found that, if the bismuth is melted and cerium bismuthide is precipitated therefrom by the addition of cerium metal, polonium is carried by the cerium bismuthide precipitate or coprecipitated therewith, probably in the form of cerium polonide. The polonium-containing cerium bismuthide is lighter than the bismuth and thus floats on top; it can be separated from the bismuth by skimming or by cropping it off after solidification of the entire mass.

The quantity of cerium to be added should be such as to dissolve completely at 500 to 600° C., i.e., 0.7 to 2.0 weight percent.

In the following, an example is given to illustrate the process of this invention.

*Example I*

Neutron-irradiated bismuth metal containing about $10^9$ d/m $Po^{210}$ was used for the process. The alloy, 0.297 gram, was diluted with 45.62 grams of chemically pure bismuth metal. The mixture was placed in a Vycor bulb whose bottom section was 0.8 cm. wide and 15 cm. high and whose top section had a diameter of 2.5 cm. and a height of 10 cm. Cerium metal pieces in a total quantity of 0.616 gram were then added to the alloy. The bulb was evacuated and sealed at the upper, wider, end.

The bulb was then heated to 500° C. in a horizontal position in a furnace and held at this temperature for 28 hours; during the entire time the furnace was rocked for better mixing and contact. The bismuth was melted at this temperature, and the cerium was dissolved therein at a slow speed.

Upon dissolution, that is, after the 28 hours, the furnace containing the bulb was turned by 90 degrees so that the narrow section of the bulb was on top; molten metal was caused thereby to enter the narrow part of the bulb. The temperature was then reduced to 400° C. and held there for four hours, whereby phase separation took place. At the end of this period, cerium bismuthide floated on the top of the narrow column of bismuth metal. The content of the bulb was then allowed to solidify, whereupon the bulb was broken. The narrow 15-cm.-long column of bismuth metal was sectioned into 1-cm.-long pieces, and each piece was analyzed for its $Po^{210}$ content.

The analysis showed that the top piece of 1 inch contained 81% by weight of the total $Po^{210}$ originally present, while the other 14 pieces contained the remaining 19% in a rather uniform distribution. The top piece containing the 81% of polonium had only 5% of the total bismuth, while the remaining 95% of the bismuth contained the residual 19% of polonium. This shows a very high concentration of the bulk of the polonium in a small amount of bismuth.

The above-described experiment was repeated using identical conditions with the exception that no cerium was added. In this instance, a polonium concentration did not take place; the polonium was distributed uniformly throughout the 15 cm. of bismuth metal.

*Example II*

A 37.8-gram sample of neutron-irradiated bismuth containing between 1 and 2 p.p.m. of polonium was mixed with 1.109 grams of cerium metal. The mixture was melted, agitated, cooled, sectioned, and analyzed in the same manner as described in Example I. However, the times were shortened, so that the total time for the cycle was 8 hours rather than 33 hours. In this experiment, 60.2% of the $Po^{210}$ was concentrated in 8.3% of the bismuth.

The cerium bismuthide and its entrained polonium may be separated from the bismuth in other ways. The molten mass may be subjected to centrifugal force while cooling to secure a more rapid separation than that produced by gravitational settling. Zone refining methods may be used to concentrate the cerium bismuthide and the polonium at one end of a bar. A particularly desirable method for large-scale operation is to cool the mass to a temperature just above the melting point of bismuth to precipitate the cerium bismuthide and then to filter the mixture through a sintered stainless steel filter maintained at the same temperature. Preferably, an inert gas, e.g., argon, under pressure is used to increase the flow through the filter.

The method just described represents a suitable means for converting polonium into a shippable form, and it also represents a method qualified for the regeneration of the bismuth for recycling into a reactor. The process of this invention also is a preliminary process for concentrating the polonium so that isolation of the polonium by any of the known processes requires the handling of smaller quantities of metal and less shielding, smaller plant size and reduced operating cost are possible.

Rare earths other than cerium are also operative for the process just described. However, cerium is preferred because of its relatively low thermal-neutron-capture cross section. If small amounts of cerium remain in the bismuth after phase separation and the latter is recycled into the reactor, the operation of the reactor is not affected too severely.

It will be understood that the invention is not to be limited to the details given herein but that it may be modified within the scope of the appended claims.

The embodiments of the invention in which an exclusive property or privilege is claimed are defined as follows:

1. A method of recovering polonium values from a solution in bismuth metal, comprising melting said solution; adding cerium metal to said solution, whereby cerium bismuthide is precipitated and said polonium values are carried by said cerium bismuthide; and separating the polonium-containing cerium bismuthide from bismuth metal.

2. The process of claim 1 wherein the molten bismuth is brought to between 500 and 600° C.

3. The process of claim 1 wherein cerium is added in a quantity to yield a concentration of between 0.7 and 2.0% by weight of the solution.

References Cited by the Examiner

The Condensed Chemical Dictionary, 5th ed., 1956, Reinhold Pub. Co., New York, pp. 877 and 878.

Raggenbass: Third International Conference on the Peaceful Uses of Atomic Energy, vol. 10, 1965, pp. 538 to 542.

BENJAMIN R. PADGETT, *Acting Primary Examiner.*

L. A. SEBASTIAN, *Assistant Examiner.*